Feb. 18, 1930. N. W. WEBB 1,747,272
METALLIC FABRIC AND METHOD OF FORMING SEAMS THEREIN
Filed June 6, 1927
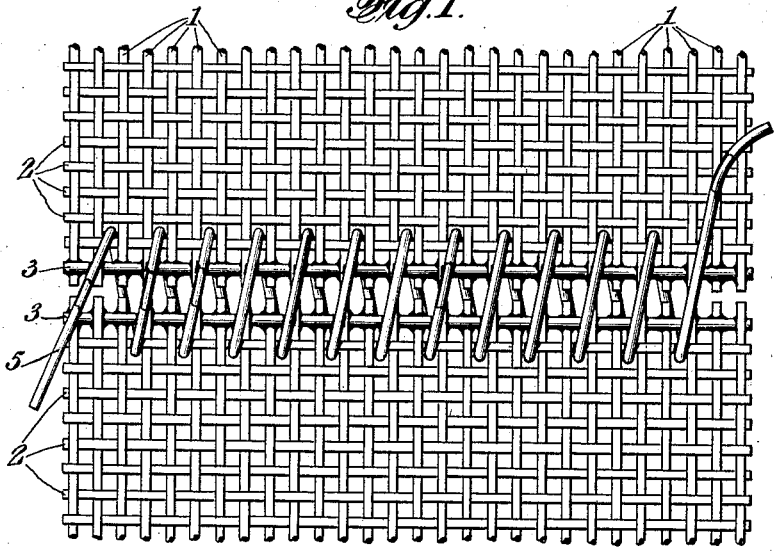
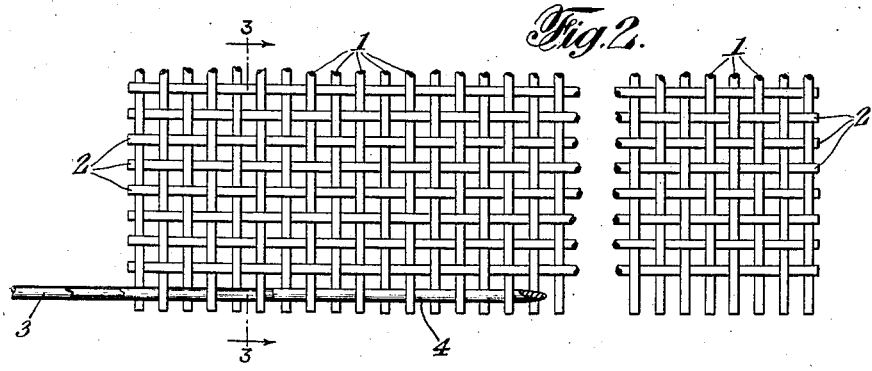
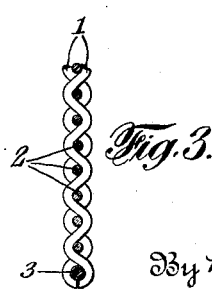
Inventor
Nelson W. Webb
By his Attorneys
Kenyon & Kenyon Patented Feb. 18, 1930                                                                        1,747,272

UNITED STATES PATENT OFFICE

NELSON W. WEBB, OF BELLEVILLE, NEW JERSEY, ASSIGNOR TO EASTWOOD WIRE MANUFACTURING COMPANY, OF BELLEVILLE, NEW JERSEY, A CORPORATION OF NEW JERSEY

METALLIC FABRIC AND METHOD OF FORMING SEAMS THEREIN

Application filed June 6, 1927. Serial No. 196,702.

My invention relates to a method of forming a seam in a woven metallic fabric, such as the wire cloth used to form an endless belt for a paper-making machine.

In such belts it is customary to secure the ends of the wire cloth together by means of a lacing wire. To prevent the seam from loosening or coming apart, it is customary to secure the end weft wires in place by whip stitching. It has also been suggested that the said weft wires be soldered in place; but the application of solder in the usual way may leave lumps of solder which may mark the paper.

The principal object of my invention is to provide an improved method of forming a seam between the ends of the fabric. To this end I place in the edge of the fabric to be joined a thread previously covered with or encased in solder. Such a solder-covered wire may be formed by encasing the wire in a tubular covering of solder and drawing the solder-covered wire to size. This leaves a very thin uniform layer of solder over the entire surface of the wire. By heating the wire so as to melt the solder, a suitable flux having been applied thereto, the wire becomes secured to the intersecting wires by an intimate metallic union. Furthermore there will be no lumps of solder to fill up any of the openings in the cloth. Any suitable solder may be used, the word solder wherever referred to hereinafter being intended to include soft-solder, hard-solder, or brazing material, unless the contrary is expressly stated. For use in connection with wire fabric for belts for paper-making machines, I prefer to employ a hard-solder or brazing material, such as silver solder. To secure added strength the lacing wire may also be secured in place; and to this end it may also be in the form of a solder-covered wire secured in place by heating so as to melt the solder.

The solder-covered fabric wire may be placed in position in the fabric in various ways. I have found, however, that this may be conveniently and efficiently done by removing the end weft wires and threading solder-covered wires in their places. As, in the case of the wire belts for paper-making machines, the wire to be inserted is somewhat soft due to annealing, the threading thereof into the fabric may be facilitated by securing the same to a stiffer threading or needle wire which may be formed of an unannealed wire of the material of which the cloth is made. This is generally brass or bronze. Sometimes the fabric is made entirely of one of these materials, while at other times the wires running in one direction are formed of one of these materials while those running at right angles thereto are formed of the other material. The harder threading wire is passed through the fabric so as to draw with it the solder-covered wire and to position the latter in the same relation to the warp wires and the rest of the fabric as the withdrawn wire had occupied before withdrawal.

The solder-covered wires may also be woven into the fabric when the cloth is woven.

The accompanying drawing forming part of this specification illustrates an enlargement of one embodiment of my invention.

In the drawing,

Fig. 1 is a plan view of a part of a belt containing the seam;

Fig. 2 is a plan view of a portion of fabric showing the threading of solder-covered wire into place; and Fig. 3 is a cross-section on line 3—3 of Fig. 2.

The fabric shown is of the ordinary plain weave type having warp wires 1 and weft wires 2. In forming the seam, the end weft wires are first removed. Figs. 2 and 3 show the fabric after the said wires have been removed. The solder-covered wire 3 is now threaded between the alternating upper and lower warp wires 1, the wire 3 as shown being secured to a stiffer needle wire 4, as by soldering or brazing. This enables the ready threading of the wires 4 and 3 between the warp wires as shown. While the use of the stiffer wire 4 facilitates the placing of the solder-covered wire in position, I have found that the latter wire may be accurately positioned in the place of the removed weft wire without the use of a stiffer wire.

To form a belt, for example a belt for a paper-making machine, the ends of the fabric may now be secured together by a lacing wire 5 which, as shown in Fig. 1, is a solder-covered wire. After the solder-covered wires 3 have been positioned in the opposite ends of the fabric they may be readily secured in that position by the application of heat to melt the solder, whereby an intimate metallic union is formed between the weft wires 3 and the warp wires 1. The soldered wires will be found to be fixedly and firmly held in place, and the edge weft wires 3 will occupy the precise position previously occupied with respect to the fabric by the withdrawn weft wires before the withdrawal of the latter. The lacing wire 5, which is hand-sewed after the securing of the wires 3, may also be secured through the application of heat by an intimate metallic union at its points of intersection with the seam. The rigid securing of the soldered wires in position will prevent tearing apart of the seam; and by reason of the uniform distribution of the solder on the said wires there will be no objectionable lumps of solder at the seam. Because of the great strength of the union between the wires 3 and the warp wires 1, the lacing wire may, if desired, be directly engaged about the wires 3, and it may also be of plain or uncovered wire, not secured by a metallic union.

Having thus described my invention, what I claim as new and desire to secure by Letters Patent of the United States is:

1. The method of forming a seam for woven wire cloth, which comprises arranging along each of the opposite edges thereof a thread previously covered with solder, securing said threads to the fabric by the application of heat, lacing the said edges together by a wire previously covered with solder, and securing the solder-covered lacing wire to the fabric by application of heat.

2. The method of forming a wire cloth belt comprising warp and weft wires, which comprises providing a weft strand at each end of a length of wire cloth, of different characteristics from said warp and weft wires comprising the length of cloth, and consisting of a pre-soldered-coated wire, forming solder joints from said solder-coat at the points of intersection of said solder-coated weft strands with the warp strands by the application of heat, and securing the two ends of the cloth together by a lacing wire to form a seam.

3. The method of forming a wire cloth belt comprising warp and weft wires, which comprises removing weft strands from each end of a length of wire cloth, inserting replacement weft strands in substitution of said removed strands, of different characteristics from said removed strands, and consisting of pre-solder-coated wire, forming solder joints from said solder-coat at the points of intersection of said solder-coated weft strands with the warp strands by the application of heat, and securing the two ends of the cloth together by a lacing wire to form a belt.

4. In a wire cloth belt, a length of woven wire cloth comprising warp and weft wires, a weft strand at each end, of different characteristics from said warp and weft wires comprising said length of cloth, engaged between the overlying and underlying warp wire ends, and comprising solder-coated wire connected to the warp wire ends by heat-produced solder joints formed from said solder coat, and a lacing wire connecting the ends of said cloth together to form a belt.

5. In a wire cloth belt, a length of woven wire cloth comprising warp and weft wires, a weft strand at each end, of different characteristics from said warp and weft wires comprising said length of cloth, engaged between the overlying and underlying warp wire ends, and comprising a length of wire consisting of a core and a uniform coating of solder completely encasing said core along its entire length and connected to the warp wire ends by heat-produced solder joints formed from said solder coat, and a lacing wire connecting the ends of said cloth together to form a belt.

6. In a wire cloth belt, a length of woven wire cloth comprising warp and weft wires, a weft strand at each end, of different characteristics from said warp and weft wires comprising said length of cloth, engaged between the overlying and underlying warp wire ends, and comprising solder-coated wire connected to the warp wire ends by heat-produced solder joints formed from said solder coat, said joints being coextensive with the superimposed areas of said solder-coated wires and said warp wire ends and extending beyond said superimposed areas in the longitudinal direction of said warp wires, and a lacing wire connecting the ends of said cloth together to form a belt.

7. In a wire cloth belt, a length of woven wire cloth comprising warp and weft wires, a replacement weft strand at each end, of different characteristics from said warp and weft wires comprising said length of cloth, engaged between the overlying and underlying warp wire ends in substitution of a removed and previously woven-in weft wire, and comprising solder-coated wire connected to the warp wire ends by heat-produced solder joints formed from said solder coat, and means connecting the ends of said cloth together to form a belt.

In testimony whereof, I have signed my name to this specification.

NELSON W. WEBB.